United States Patent Office 3,839,510
Patented Oct. 1, 1974

3,839,510
O-ETHYL-S,S-DI-ALKYL-PHOSPHOROTHIONODI-THIOLATES
Akio Kudamatsu and Kozo Shiokawa, Kanagawa-ken, Japan, assignors to Bayer Aktiengesellschaft, Leverkusen, Germany
No Drawing. Filed June 28, 1972, Ser. No. 266,954
Claims priority, application Japan, July 12, 1971, 46/51,102
Int. Cl. A01n 9/36; C07f 9/16
U.S. Cl. 260—963                5 Claims

ABSTRACT OF THE DISCLOSURE

O-ethyl-S,S-di-alkyl-phosphorothionodithiolates of the formula

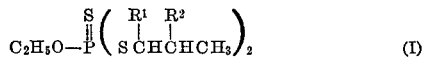

(I)

wherein $R^1$ and $R^2$ stand for a hydrogen atom or a methyl group, preferably at least one being a hydrogen atom, which possess insecticidal and nematocidal properties.

---

The present invention relates to and has for its objects the provision of particular new O-ethyl-S,S-di-alkyl-phosphorothionodithiolates, i.e. O - ethyl-S,S-di(n-propyl)-, (sec-butyl)- or (iso-butyl)-phosphorothionodithiolates, which possess insecticidal and nematocidal properties, active compositions in the form of mixtures of such compounds with solid and liquid dispersible carrier vehicles, and methods for producing such compounds and for using such compounds in a new way especially for combating pests, e.g. insects and nematodes, with other and further objects becoming apparent from a study of the within specification and accompanying examples.

Agricultural chemicals should have an excellent activity and exhibit a positive effect while giving a low phytotoxicity to plants to which they are applied. It is also important that they should be harmless to men who utilize them. For instance, Parathion which is a typical insecticide which has heretofore been used in great quantity for controlling harmful insects on rice plants such as rice stem borer, planthopper and leafhopper, is very effective for controlling harmful insects, but because of its high toxicity there is a great danger of acute toxicosis in men and domestic animals. Accordingly, the use of Parathion is now inhibited in some countries. Organic phosphorus chemicals such as Parathion, EPN, Baycid and Sumithion, organic chlorine chemicals such as BHC and DDT, and carbamate chemicals such as Sevin have been used in great quantities for controlling harmful insects for a long time, and it has now been observed that harmful insects have acquired resistances to these chemicals. This problem of resistance to chemicals is particularly serious in the case of rice stem borers because only organic phosphorus chemicals are now used as insecticides for controlling them. Thus, novel agricultural chemicals exhibiting toxicity selectively to harmful insects while being slightly or not at all toxic to warm-blooded animals and being effective for controlling harmful insects which have acquired resistance to chemicals are in great demand.

The present invention provides compounds which have a very low toxicity to warm-blooded animals and have an excellent insecticidal activity against harmful insects, especially insects belonging to the Lepidoptera whose control is very difficult, such as rice stem borer, tobacco cutworm and almond moth.

From the specification of Japanese Patent Publication No. 16,875/63 it is known that the compound of the following formula

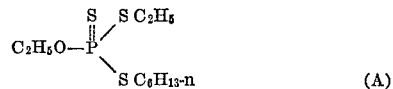

(A)

has an insecticidal activity. From the specification of U.S. Pat. No. 3,210,244 it is known that the compound of the following formula

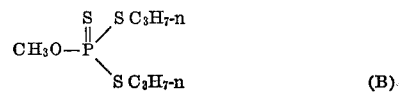

(B)

has an insecticidal activity.

The present invention provides organic phosphoric acid esters of the following general formula:

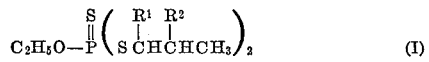

(I)

wherein $R^1$ and $R^2$ stand for a hydrogen atom or a methyl group, preferably at least one being a hydrogen atom.

The present invention also provides a process for the production of a compound of formula (I) in which (a) The thionophosphoric acid dichloride of the formula

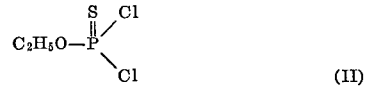

(II)

is reacted with a mercaptan of the formula

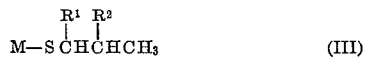

(III)

wherein $R^1$ and $R^2$ are as defined above and M stands for hydrogen or a metal or ammonium, or (b) The phosphorous acid dichloride of the formula

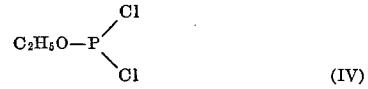

(IV)

is reacted with a mercaptan of the formula

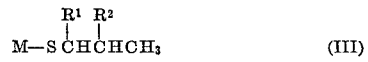

(III)

wherein $R^1$ and $R^2$ are as defined above and M stands for hydrogen or a metal or ammonium, and the product is reacted with sulfur.

The effects of the compounds of the present invention are much superior to the effects of the compound of formula (A), as will be apparent from the data shown in Tables given below.

The compound (B) has a toxicity as high as that of Methyl Parathion (acute oral toxicity on mouse $LD_{50}$ 20 mg./kg.), and it cannot be applied in practice as a spraying chemical. As is seen from the knowledge that the O-ethyl parathion (Ethyl Parathion) has a toxicity 4 times as high as that of the O-methyl parathion (Methyl Parathion), it has been a theory established in the art that in organic phosphoric acid esters O-ethyl products have a much higher toxicity than the O-methyl products. In view of this established theory, it is very surprising that, as is seen from the data shown in Table 1, the toxicity of the O-ethyl-trithio-phosphoric acid esters of the present invention is one-eighth to one-twelfth of the toxicity of the O-methyl-trithio-phosphoric acid ester (B).

TABLE 1.—RESULTS OF TESTS ON TOXICITY TO MOUSE

| Compound | | Acute oral toxicity (LD$_{50}$ mg./kg.) |
|---|---|---|
| (1) | $C_2H_5O-\overset{S}{\overset{\|}{P}}(S\,C_3H_7\text{-n})_2$ (this invention). | 165 |
| (2) | $C_2H_5O-\overset{S}{\overset{\|}{P}}\left(S\,\overset{CH_3}{\overset{\|}{C}H}CH_2CH_3\right)_2$ (this invention). | 250 |
| (3) | $C_2H_5O-\overset{S}{\overset{\|}{P}}\left(S\,CH_2\overset{CH_3}{\underset{CH_3}{C}H}\right)_2$ (this invention). | 180 |
| | $CH_3O-\overset{S}{\overset{\|}{P}}(S\,C_3H_7\text{-n})_2$ (U.S. Pat. 3,210,244) | 20 |
| | $\begin{array}{c}CH_3O\\ \phantom{CH_3O}\diagdown\\ CH_3O\diagup\end{array}\overset{S}{\overset{\|}{P}}-O-\!\!\!\left\langle\!\!\!\bigcirc\!\!\!\right\rangle\!\!\!-NO_2$ (Methyl parathion). | 20 |
| | $\begin{array}{c}C_2H_5O\\ \phantom{C_2H_5O}\diagdown\\ C_2H_5O\diagup\end{array}\overset{S}{\overset{\|}{P}}-O-\!\!\!\left\langle\!\!\!\bigcirc\!\!\!\right\rangle\!\!\!-NO_2$ (Ethyl parathion). | 5 |

As is seen from the above Table, although the compound (B) of U.S. Pat. No. 3,210,244 has a very high toxicity, the compounds of this invention have a peculiarly low toxicity. Their activity is very positive without causing any significant phytotoxicity to plants. Further, they can be used effectively for controlling harmful insects of a broad range including insects belonging to Lepidoptera and are of great utility.

Furthermore, the compounds of this invention are characterized by quick activity and long-lasting effect, and they can be used for controlling harmful insects of a broad range such as sucking insects, biting insects, plant parasites, stored grain insects and insects which are hygiene pests.

For instance, the active compounds of this invention are effective for controlling insects such as insects belonging to the Coleoptera, for example small rice weevil (Sitophilus oryzae), rust-red flour beetle (Tribolium castaneum), 28-spotted lady beetle (Epilachna vigintioctopunctata), barley wireworm (Agriotes fusciollis) and soy-bean beetle (Anomala rufocuprea); insects belonging to the Lepidoptera, for example gypsy moth (Lymantria dispar), tent caterpillar (Malacosoma neustria testacea), common cabbageworm (Pieris rapae crucivora), tobacco cutworm (Prodenia litura), rice stem borer (Chilo suppressalis), smaller tea tortrix (Adoxophyes orana) and almond moth (Ephestia cautella); insects belonging to the Hemiptera, for example green rice leaf hopper (Nephotettix cincticeps), brown planthopper (Nilaparvata lugens), comstock mealybug (Pseudococcus comstocki), arrowhead scale (Unaspis yanonensis), green peach aphid (Myzus persicae), apple aphid (Aphis pomi) and cabbage aphid (Brevicoryne brassicae); insects belonging to the Orthoptera, for example German cockroach (Blatella germanica), American cockroach (Periplaneta americana) and African mole cricket (Gryllotalpa africana); insects belonging to the Isoptera, for example Japanese termite (Leucotermes speratus); and insects belonging to the Diptera, for example house fly (Musca domestica vicina), yellow-fever mosquito (Aedes aegypti), seed-corn maggot (Hylemia platura), pale house mosquito (Culex pipiens), Chinese malaria mosquito (Anopheles sinensis) and smaller house mosquito (Culex tritaeniorhynchus).

The active compounds of this invention are also effective for controlling nematodes such as southern root-knot nematode (Meloidogyne incognita acrita), rice white-tip nematode (Aphelenchides bessei) and soybean cyst nematode (Heterodera glycines).

In the field of veterinary medicine, the compounds of this invention may be effectively used for controlling animal parasites (obligate parasites and ectoparasites) such as ticks, parasitic insects and helminths.

In this specification, compounds having an activity against all of the above-mentioned pests are sometimes called insecticides generically.

Process variant (a) is illustrated by the following formula scheme:

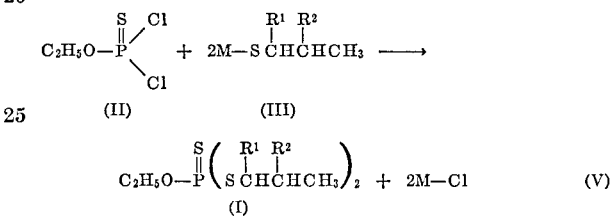

As examples of the alkyl mercaptan of general formula (III), there may be mentioned n-propyl mercaptan, iso-butyl mercaptan and sec-butyl mercaptan. Sodium or potassium salts of these mercaptans may be used.

Process variant (b) is illustrated by the following reaction scheme:

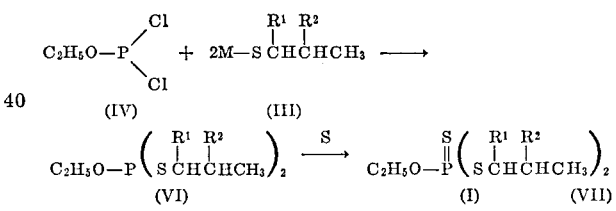

In either of the above process variants for the synthesis of the active compounds of this invention, it is preferred to conduct the reaction in the presence of a solvent or diluent. For this purpose any inert solvent or diluent may be used.

As examples of the solvent or diluent there may be cited water; aliphatic, alicyclic and aromatic hydrocarbons (which may be halogenated) such as hexane, cyclohexane, petroleum ether, ligroin, benzene, toluene, xylene, methylene chloride, chloroform, carbon tetrachloride, mono-, or di- or trichloroethylene, and chlorobenzene; ethers such as diethyl ether, methyl ethyl ether, di-isopropyl ether, dibutyl ether, ethylene oxide, dioxane and tetrahydrofuran; ketones such as acetone, methyl ethyl ketone, methyl isobutyl ketone and methyl isopropyl ketone; nitriles such as acetonitrile, propionitrile and acrylonitrile, alcohols such as methanol, ethanol, isopropanol, butanol and ethylene glycol; esters such as ethyl acetate and amyl acetate; acid amides such as dimethyl formamide and dimethyl acetamide; and sulfoxides and sulfones such as dimethyl sulfoxide and sulfolane.

The above synthesis reaction may be conducted in the presence of an acid binder. For this purpose, there may be used customary acid binders such as hydroxides, carbonates, bicarbonates and alcoholates of alkali metals, and tertiary amines, for example triethylamine, diethylaniline and pyridine.

When the reaction is effected in the absence of an acid binder, the intended product of high purity can be obtained in high yield by forming a salt, preferably an alkali metal salt, of the corresponding alkyl mercaptan in advance and then reacting the salt with a phosphoric (or phosphorous) acid ester dichloride.

In both the above process variants, the reaction may be effected at temperatures over a broad range, but generally the reaction is carried out at from about $-20°$ C. to the boiling point of the reaction mixture, preferably temperatures being in the range of from about 0 to $100°$ C.

It is preferable that the reaction is conducted under atmospheric pressure but it is possible to conduct the reaction under reduced or elevated pressures.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, ethylenechloride, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

The compounds of this invention may be used mixed with other agricultural chemicals such as other insecticides, acaricides, nematocides, antivirus agents, herbicides, plant growth regulators (for instance organic phosphoric acid esters, carbamate compounds, dithio or thiol carbamate compounds, organic chlorine compounds, dinitro compounds, organosulfur or organometallic compounds, antibiotic compounds, substituted diphenyl ethers, urea compounds and triazine compounds), and/or fertilizers.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.005–10%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.1–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 3 to 1000 g./hectare, preferably 30 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100 by weight of the active compound.

It will be realized, of course, that the concentration of the particular active compound utilized in admixture with the carrier vehicle will depend upon the intended application. Therefore, in special cases it is possible to go above or below the aforementioned concentration ranges.

The insecticidal and nematocidal compounds, or ready-to-use preparations containing the active compounds, may be applied in accordance with methods usually adopted in the field of agricultural chemicals such as spraying (for instance liquid spraying, liquid scattering, misting, atomizing, dust scattering, granule scattering, water surface-applying and pouring); fumigating; soil-applying (for instance, mixing, sprinkling, vaporing and injecting); surface-applying (for instance, coating, banding, powder-coating and covering); dipping; and baiting.

Furthermore, the present invention contemplates methods of selectively killing, combating or controlling pests, e.g. insects, acarids, fungi, bacteria and yeasts, and more particularly methods of combating at least one of insects and acarids, which comprises applying to at least one of correspondingly (a) such insects, (b) such nematodes and (c) the corresponding habitat thereof, i.e. the locus to be protected, a correspondingly combative or toxic amount, i.e. an insecticidally or nematocidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

The synthesis, unexpected superiority and outstanding activity of the particular new compounds of the present invention are illustrated, without limitation, by the following examples:

EXAMPLE 1

(Wettable Powder)

15 parts of O-ethyl-S,S-di-n-propyl-phosphorothionodithiolate, 80 parts of a 1:5 mixture of diatomaceous earth and kaolin and 5 parts of an emulsifier ("Runnox," polyoxyethylene alkyl aryl ether) were ground and mixed together to form a wettable powder. It was diluted with water to a concentration of 0.05% by weight and applied to harmful insects and/or places where harmful insects lived.

EXAMPLE 2

(Emulsifiable Liquor)

30 parts of O-ethyl-S,S-di-sec-butyl-phosphorothionodithiolate, 30 parts of xylene, 30 parts of "Kawakazol" (high boiling aromatic hydrocarbon), and 10 parts of an emulsifier ("Sorpol," polyoxyethylene alkyl aryl ether) were mixed with stirring to form an emulsifiable liquor. It was diluted with water to 0.05% by weight and sprayed on harmful insects and/or places where harmful insects lived.

EXAMPLE 3

(Dust)

2 parts of O-ethyl-S,S-di-iso-butyl-phosphorothionodithiolate and 98 parts of a 1:3 mixture of talc and clay were ground and mixed together to form a dust. It was scattered on harmful insects and/or places where harmful insects lived.

EXAMPLE 4

(Dust)

1.5 parts of O-ethyl-S,S-di-n-propylphosphorothionodithiolate, 2 parts of an organic phosphoric acid ester, 0.5 parts of iso-propyl hydrogen phosphate (PAP) and 96 parts of a 1:3 mixture of talc and clay were ground and mixed together to form a dust. It was scattered on harmful insects and/or places where harmful insects lived.

EXAMPLE 5

(Granule)

25 parts of water were added to a mixture of 10 parts of O-ethyl - S,S - di-sec-butylphosphorothionodithiolate, 10 parts of bentonite, 78 parts of a 1:3 mixture of talc and clay and 2 parts of lignin sulfonate. The resulting mixture was intimately blended and finely divided by means of an extruding granulator to yield granules of 20–40 mesh, followed by drying at 40–50° C. The resulting granules were sprayed on harmful insects and/or places where harmful insects lived.

EXAMPLE 6

(Granule)

95 parts of clay particles of a size distribution of 0.2–2 mm. were taken into a rotary mixer and a solution of 5 parts of O-ethyl - S,S - di-iso-butyl-phosphorothionodithiolate in an organic solvent was sprayed on the particles being rotated, thereby wetting them uniformly. Then they were dried at 40–50° C. to form coated granules. They were sprayed on harmful insects and/or places where harmful insects lived.

EXAMPLE 7

(Oil Preparation)

0.5 part of O-ethyl - S,S - di-n-propylphosphorothionodithiolate, 20 parts of Velsicol AR–50 (high boiling aromatic hydrocarbon), and 79.5 parts of Deobase (deodorized kerosene) were mixed with stirring to form an oil preparation. It was sprayed on harmful insects and/or places where harmful insects lived.

EXAMPLE 8

Test on Effects Against Rice Stem Borers

Preparation of sample chemicals:
Solvent: 3 parts by weight of xylene
Emulsifier: 1 part by weight of alkylaryl polyglycol ether.

In order to prepare a suitable formulation of an active compound, one part by weight of the active compound is mixed with the above amount of the solvent containing the above amount of the emulsifier, and the mixture is diluted with water to form an aqueous dilution containing the active compound at a prescribed concentration.

Test procedure: Aquatic rice tillers planted in a pot of 12 cm. diameter are tainted with egg masses of rice stem borers. Seven days after hatching, a dilution of an emulsifiable liquor containing the compound of this invention at the perscribed concentration is sprayed in an amount of 40 ml. per pot and the chemical-sprayed pot is kept in a green house for 3 days. The stems of the so-treated rice are examined separately to count the numbers of living worms and dead worms and to calculate the killing ratio. The results are shown in Table 2.

EXAMPLE 9

Test on Tobacco Cutworms

Test procedure: Sweet potato leaves are dipped in a dilution of an emulsifiable liquor containing the active compound at the prescribed concentration and prepared in the same manner as in Example 8, dried in the air and placed in a 9 cm. diameter Petri dish. Then 10 third-instar tobacco cutworms are put into the dish and the dish is kept in a thermostat chamber maintained at 28° C. After 24 hours have passed, the number of the dead larvae is counted and the killing ratio is calculated. The results are shown in Tables 2 and 3.

EXAMPLE 10

Test on Larvae of Almond Moth

A wire gauze vessel of 7 cm. diameter and 0.9 cm. height is charged with 20 almond moth mature larvae and the vessel is dipped for 10 seconds in an aqueous dilution of an emulsifiable liquor containing the active compound at the prescribed cocncentration and prepared in the same manner as in Example 8. Then the vessel is kept for 24 hours in a thermostat chamber. The number of dead larvae is counted and the killing ratio is calculated. The results are shown in Table 2.

TABLE 2

Results of test on effects of compounds of this invention and analogous compounds on insects belonging to the lepidoptera

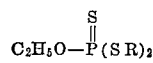

$$C_2H_5O-\overset{S}{\underset{\parallel}{P}}(SR)_2$$

| | Rice stem borers | | Tobacco cutworm | | Almond moth | |
|---|---|---|---|---|---|---|
| R | 0.1 | 0.025 | 0.1 | 0.01 | 0.1 | 0.01 |
| $C_2H_5$ (comparison) | 12.3 | 9.5 | 0 | 0 | 0 | 0 |
| $C_3H_7$-n (1) | 100 | 100 | 100 | 30 | 100 | 80 |
| $C_3H_7$-iso (comparison) | 20.7 | 17.6 | 10 | 0 | 0 | 0 |
| $C_4H_9$-sec (2) | 100 | 95 | 100 | 40 | 100 | 90 |
| $C_4H_9$-iso (3) | 100 | 65 | 100 | 20 | 100 | 55 |
| $C_4H_9$-n (comparison) | 42.0 | 11.3 | 30 | 0 | 20 | 0 |
| $C_6H_{15}$-n (comparison) | 15.1 | 18.5 | 0 | 0 | 0 | 0 |
| Untreated control | 19.2 | 19.2 | 0 | 0 | 0 | 0 |

TABLE 3.—TEST ON EFFECT AGAINST TOBACCO CUTWORMS

| Compound | Active ingredient concentration (percent) | | |
|---|---|---|---|
| | 0.1 | 0.03 | 0.01 |
| | Killing rate (percent) | | |
| (1) $C_2H_5O-\overset{S}{\overset{\|}{P}}(SC_3H_7-n)_2$ | 100 | 100 | 30 |
| (2) $C_2H_5O-\overset{S}{\overset{\|}{P}}(S\overset{CH_3}{\overset{\|}{C}}HCH_2CH_3)_2$ | 100 | 100 | 40 |
| (3) $C_2H_5O-\overset{S}{\overset{\|}{P}}\left(SCH_2CH\diagdown_{CH_3}^{CH_3}\right)_2$ | 100 | 100 | 20 |
| A[1] (comparison) | 0 | 0 | 0 |
| B[2] (comparison) | 100 | 80 | 0 |
| Sumithion[3] (comparison) | 100 | 60 | 0 |
| Dipterex[4] (comparison) | 100 | 20 | 0 |
| Untreated control | 0 | | |

[1] A = O,S-diethyl-S-n-hexylphosphorothionodithiolate disclosed in the specification of Japanese Pat. publication No. 16,875/63.
[2] B = O-methyl-S,S-di-n-propylphosphorothionodithiolate disclosed in the specification of U.S. Pat. No. 3,210,244.
[3] Sumithion = dimethyl-(3-methyl-4-nitrophenyl)thiophosphate.
[4] Dipterex = dimethyl-2,2,2-trichloro-1-hydroxyethylphosphonate.

EXAMPLE 11

Test on Effects Against Root Knot Nematodes

Preparation of sample chemical: 2 parts by weight of the active compound is mixed with 98 parts by weight of talc, and the mixture is ground to form a dust.

Test procedure: The so prepared chemical is mixed with a soil infected with sweet potato root knot nematodes in an amount such that a prescribed concentration of the active compound is attained in the soil. The results soil is uniformly stirred and mixed, and then it is packed in a pot having an area of 1/5000 are. Then about 20 seeds of tomato (Kurihara variety) are sown per pot and cultivated for 4 weeks in a green house. Then each tomato is drawn out from the soil without hurting the root. The infestation grade is evaluated with respect to 10 tomatoes as one group based on the following scale.

Knot index:
0—no knot (perfect control)
1—knots are formed slightly
2—knots are formed middlingly
3—knots are formed considerably
4—formation of knots is extreme.

The infestation grade is determined by the following equation:

Infestation grade $$=\frac{\Sigma\ (\text{rank value})\times(\text{rank population})}{(\text{whole population})\times 4}\times 100$$

The results are shown in Table 4.

TABLE 4.—RESULTS OF TESTS ON EFFECTS AGAINST ROOT KNOT NEMATODES

| Compound | Infestation grade |
|---|---|
| (1) $C_2H_5O\overset{S}{\overset{\|}{P}}(SC_3H_7-n)_2$ | 0 |
| (2) $C_2H_5O\overset{S}{\overset{\|}{P}}(S\overset{CH_3}{\overset{\|}{C}}HCH_2CH_3)_2$ | 2.0 |
| (3) $C_2H_5O\overset{S}{\overset{\|}{P}}\left(SCH_2CH\diagdown_{CH_3}^{CH_3}\right)_2$ | 0 |
| A (comparison) | 78.1 |
| Terracur-P[1] (comparison) | 4.1 |
| Untreated control | 62.5 |

[1] Terracur-P = O,O-dimethyl-O-(4-methylsulphinyl)phenylphosphorothiolate.

EXAMPLE 12

Test on Effects Against House Fly

Test procedure: A sheet of filter paper is spread in a Petri dish of 9 cm. diameter and 1 ml. of an aqueous dilution containing the active compound at the determined concentration and prepared in the same manner as in Example 8 is poured into the dish. Then 10 female house flies are put into the dish and the dish is kept for 24 hours in a thermostat chamber maintained at 28° C. The number of dead flies is counted and the killing ratio is calculated. The results are shown in Table 5.

TABLE 5.—RESULTS OF TESTS ON EFFECTS AGAINST MUSCIDS

| Compound | Active ingredient concentration (percent) | | |
|---|---|---|---|
| | 0.1 | 0.01 | 0.001 |
| | Killing ratio (percent) | | |
| (1) $C_2H_5O\overset{S}{\overset{\|}{P}}(SC_3H_7-n)_2$ | 100 | 100 | 60 |
| (2) $C_2H_5O\overset{S}{\overset{\|}{P}}(S\overset{CH_3}{\overset{\|}{C}}HCH_2CH_3)_2$ | 100 | 100 | |
| (3) $C_2H_5O\overset{S}{\overset{\|}{P}}\left(SCH_2CH\diagdown_{CH_3}^{CH_3}\right)_2$ | 100 | 100 | |
| DDT (comparison) | 100 | 50 | 0 |
| Untreated control | 0 | | |

EXAMPLE 13

Test on Effects Against German Cockroaches

Test procedure: A sheet of filter paper is spread in a Petri dish of 9 cm. diameter and 1 ml. of an aqueous diluted liquor containing the active compound at the determined concentration and prepared in the same manner as in Example 8 is poured into the dish. Then 10 female German cockroach imagines are put into the dish and the dish is kept for 24 hours in a thermostat chamber maintained at 28° C. The number of dead cockroaches is counted and the killing ratio is calculated. The results are shown in Table 6.

TABLE 6.—RESULTS OF TESTS ON EFFECTS AGAINST GERMAN COCKROACHES

| Compound | Active ingredient concentration (percent) | |
|---|---|---|
| | 0.1 | 0.01 |
| | Killing ratio (percent) | |
| (1) $C_2H_5O\overset{S}{\overset{\|}{P}}(SC_3H_7-n)_2$ | 100 | 100 |
| (2) $C_2H_5O\overset{S}{\overset{\|}{P}}(S\overset{CH_3}{\overset{\|}{C}}HCH_2CH_3)_2$ | 100 | 100 |
| (3) $C_2H_5O\overset{S}{\overset{\|}{P}}\left(SCH_2CH\diagdown_{CH_3}^{CH_3}\right)_2$ | 100 | 100 |
| Baygon[1] (comparison) | 100 | 95 |
| Untreated control | 0 | 0 |

[1] Baygon = 2-iso-propoxyphenyl-N-methylcarbamate.

EXAMPLE 14

Test on Effects Against Azuki Bean Weevils

Test procedure: 20 azuki bean weevils are soaked for 1 minute in an aqueous dilution containing the active compound at a prescribed concentration, which has been prepared in the same manner as in Example 8, and they are allowed to stand in a thermostat chamber maintained at 28° C. The number of dead weevils is counted after 24 hours have passed and the killing ratio is calculated. The results are shown in Table 7.

TABLE 7.—RESULTS OF TESTS ON EFFECTS AGAINST BEAN WEEVILS

| Compound | Active ingredient concentration (percent) | | |
|---|---|---|---|
|  | 0.1 | 0.01 | 0.001 |
|  | Killing ratio (percent) | | |
| (1) $C_2H_5O\overset{S}{\underset{\|}{P}}(SC_3H_7{-}n)_2$ | 100 | 100 | 100 |
| (2) $C_2H_5O\overset{S}{\underset{\|}{P}}(S\overset{CH_3}{\underset{\|}{C}}HCH_2CH_3)_2$ | 100 | 100 | 90 |
| (3) $C_2H_5O\overset{S}{\underset{\|}{P}}\left(SCH_2CH{\diagup}^{CH_3}_{\diagdown CH_3}\right)_2$ | 100 | 100 | 100 |

EXAMPLE 15

15.2 g. of n-propylmercaptan were added to 100 ml. of toluene containing 4.6 g. of sodium, and the mixture was gradually heated to dissolve the sodium. Then the mixture was cooled to 0° C. and 17.9 g. of O-ethylthiophosphoric acid dichloride were added thereto dropwise. After completion of the dropwise addition, the mixture was agitated for a while at room temperature and then heated at 80° C. for 2 hours. The reaction mixture was cooled to room temperature, washed with water and 1% potassium carbonate, and dried over anhydrous sodium sulfate. When toluene was removed by distillation under reduced pressure, there was obtained 22.2 g. of colorless oily O-ethyl-S,S-di-n-propyl-phosphorothionodithiolate characterized by a cooling point of 112–114° C. under 0.1 mm. Hg and a refractive index $n_D^{20}$ of 1.5498 having the following formula:

$$C_2H_5O-\overset{S}{\underset{\|}{P}}(SC_3H_7{-}n)_2 \qquad (1)$$

EXAMPLE 16

A solution of 18 g. of sec-butylmercaptan and 15.8 g. of pyridine in 80 ml. of toluene was cooled to 0° C., and 14.7 g. of O-ethylphosphorous acid dichloride were added dropwise to the solution while nitrogen gas was blown in. After completion of the dropwise addition, the mixture was agitated for a while and heated at 50° C. for 1 hour. Then 3.1 g. of sulfur were added to the mixture and it was heated at 80–90° C. for 1 hour to complete the reaction.

The reaction mixture was allowed to stand and cool to room temperature, then it was washed with water, 1% hydrochloric acid and 1% potassium carbonate, and dried over anhydrous sodium sulfate. When toluene had been removed by distillation under reduced pressure, there was obtained 23.8 g. of colorless O-ethyl-S,S-di-sec-butyl-phosphorothionodithiolate characterized by a boiling point of 125–130° C. under 0.2 mm. Hg and a refractive index $n_D^{20}$ of 1.5395 and having the following formula:

$$C_2H_5O-\overset{S}{\underset{\|}{P}}\left(S\overset{CH_3}{\underset{\|}{C}}HCH_2CH_3\right)_2 \qquad (2)$$

EXAMPLE 17

23.2 g. of O-ethyl-S,S-di-iso-butyl-phosphorothionodithiolate were prepared by repeating the procedure of Example 16 but employing 18 g. of iso-butyl mercaptan instead of sec-butyl mercaptan. The product was characterized by a boiling point of 134–136° C. under 0.3 mm. Hg and a refractive index $n_D^{20}$ of 1.5381 and had the following formula:

$$C_2H_5O-\overset{S}{\underset{\|}{P}}\left(SCH_2CH{\diagup}^{CH_3}_{\diagdown CH_3}\right)_2 \qquad (3)$$

It will be appreciated that the instant specification and examples are set forth by way of illustration and not limitation, and that various modifications and changes may be made without departing from the spirit and scope of the present invention.

What is claimed is:

1. An organic phosphoric acid ester of the formula $$C_2H_5O-\overset{S}{\underset{\|}{P}}\left(S\overset{R^1}{\underset{\|}{C}}H\overset{R^2}{\underset{\|}{C}}HCH_3\right)_2$$

wherein $R^1$ and $R^2$ stand for a hydrogen atom or a methyl group.

2. An organic phosphoric acid ester according to claim 1 wherein at least one of $R^1$ and $R^2$ is hydrogen.

3. An organic phosphoric acid ester according to claim 1 wherein such ester is O-ethyl-S,S-di-n-propylphosphorothionodithiolate of the formula $$C_2H_5O-\overset{S}{\underset{\|}{P}}(SC_3H_7{-}n)_2$$

4. An organic phosphoric acid ester according to claim 1 wherein such ester is O-ethyl-S,S-di-sec-butylphosphorothionodithiolate of the formula $$C_2H_5O-\overset{S}{\underset{\|}{P}}\left(S\overset{CH_3}{\underset{\|}{C}}HCH_2CH_3\right)_2$$

5. An organic phosphoric acid ester according to claim 1 wherein such ester is O-ethyl-S,S-di-iso-butylphosphorothionodithiolate of the formula $$C_2H_5O-\overset{S}{\underset{\|}{P}}\left(SCH_2CH{\diagup}^{CH_3}_{\diagdown CH_3}\right)_2$$

References Cited

UNITED STATES PATENTS

| 3,210,244 | 10/1965 | Wilson | 424—225 |
| 3,112,244 | 11/1963 | Goyette | 260—963 |

LORRAINE A. WEINBERGER, Primary Examiner

R. L. RAYMOND, Assistant Examiner

U.S. Cl. X.R.

424—225